United States Patent
Belli

(10) Patent No.: US 6,702,344 B2
(45) Date of Patent: Mar. 9, 2004

(54) P.R.B. SCREEN

(76) Inventor: Paul R. Belli, 398 Falmouth Rd., Hyannis, MA (US) 02601

( * ) Notice: Subject to any disclaimer, the term of this patent is extended or adjusted under 35 U.S.C. 154(b) by 0 days.

(21) Appl. No.: 09/748,254

(22) Filed: Dec. 27, 2000

(65) Prior Publication Data

US 2002/0074823 A1 Jun. 20, 2002

Related U.S. Application Data

(60) Provisional application No. 60/173,352, filed on Dec. 28, 1999.

(51) Int. Cl.$^7$ ............................................... B60C 19/42
(52) U.S. Cl. ....................................... 293/128; 280/770
(58) Field of Search ............................. 296/37.6, 39.2, 296/98, 100.15; 293/116, 117, 118, 123, 126, 128; 280/770

(56) References Cited

U.S. PATENT DOCUMENTS

| | | | | |
|---|---|---|---|---|
| 3,563,594 A | * | 2/1971 | London | 293/128 |
| 4,997,227 A | * | 3/1991 | Falzone et al. | 296/37.6 |
| 5,056,839 A | * | 10/1991 | Yoon | 293/117 |
| 5,641,179 A | * | 6/1997 | Imlach | 293/128 |
| 5,788,307 A | * | 8/1998 | Gilbert | 293/128 |
| 5,849,390 A | * | 12/1998 | Dillon | 280/770 |
| 5,938,263 A | * | 8/1999 | Barthelman | 296/37.6 |
| 5,944,372 A | * | 8/1999 | Gilbert | 296/37.6 |
| 6,254,170 B1 | * | 7/2001 | Farmer et al. | 280/770 |
| 6,296,279 B1 | * | 10/2001 | Stoddard et al. | 280/770 |

* cited by examiner

Primary Examiner—D. Glenn Dayoan
Assistant Examiner—Jason Morrow

(57) ABSTRACT

An apparatus for the protection of the outer bed walls of pickup trucks. This apparatus consists of a retractable screen having an outer layer of shock absorbing material suitable to receive signage and a rear layer of non abrasive material that can be placed on the surface of a truck without scratching the finish. Protective Cover for the Sides of a Vehicle is contained in a strong non rusting protective housing that mounts on top of the side bed wall. The length of Protective Cover for the Sides of a Vehicle would be of sufficient size to cover the length of a truck bed side wall.

1 Claim, 5 Drawing Sheets

P.R.B. SCREEN

CROSS REFERENCE TO RELATED APPLICATIONS

This application claims the benefit of U.S. provisional application Ser. No. 60/173,352 filed Dec. 28, 1999.

BACKGROUND

1. Field of Invention

This application relates to protective screens for trucks, specifically for the protection of the exterior side walls of pickup trucks an the like 2. Description of Prior Art The pickup truck has long been the backbone of the light truck industry and has become the personal transportation vehicle for many owners. Tradesmen take a lot of pride in keeping their pickup in good shape. One of the problems is keeping the pickup body free from nicks and scratches caused by belt buckles and tool belts when taking tools and equipment in and out of tool boxes or the truck bed. Owners are looking for a better way to maintain the appearance and value of their truck.

Inventors have created several types of protective covers most of which protect the bed of the truck. U.S. Pat. No. 5,758,921 to Hall (1998) discloses a retractable cover to protect the goods being transported from the weather. Others have panels or coverings that protect the sides, most of which are cumbersome to use and difficult to store and not attractive in appearance. U.S. Pat. No. 5,685,099 to Favata (1997) discloses pads that have to be attached to the sides of the truck by the use of straps. This method requires a place to store the pads when not in use. This method is cumbersome and not very efficient.

OBJECTS AND ADVANTAGES

Several objects and advantages of the present invention are:

(a) To provide a functional and ornamental protective covering for the side wall panels.

(b) To provide an easy to use and store protective covering.

(c) To provide a covering that can have written messages applied to.

(d) To keep the appearance of the vehicle looking new during all types of working conditions.

The concept of Protective Cover for the Sides of a Vehicle is to provide a protective covering for the outer bed wall of a truck. Retractable covering would enable owners to work with tools, equipment without fear of scratching or damaging painted finish of a truck. This product consists of a retractable screen having an outer layer of shock absorbing material suitable to receive signage and a rear layer of non abrasive material that can be placed on the surface of a truck without scratching the finish. This is contained in a strong non rusting protective housing that mounts on the top of the side bed wall. The length of protective housing and screen would be of sufficient size to cover length of a truck side bed wall.

DRAWING FIGURES

In the drawings, closely related figures have the same number but different alphabetic suffixes.

Figure 1A:
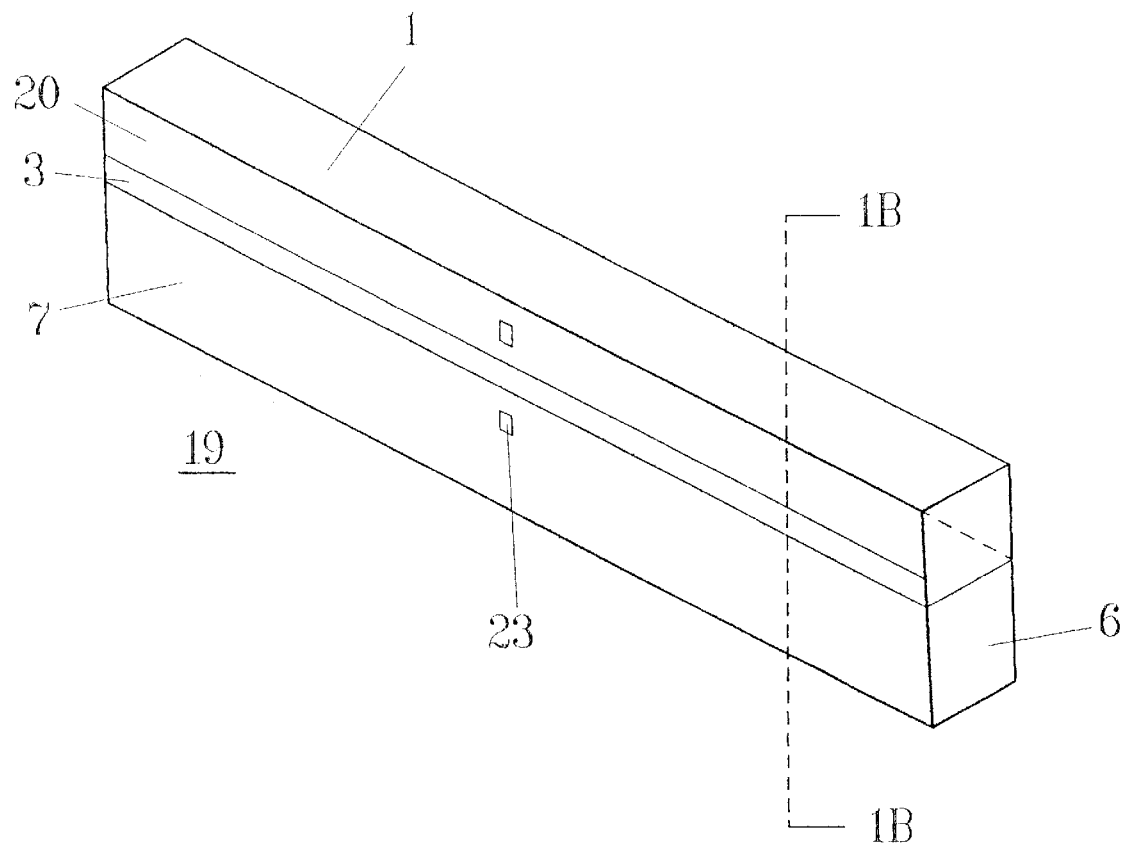
FIGS. 1A to 2 show various aspects of storage box for Body side protector for vehicles.

REFERENCE NUMERALS IN DRAWINGS 1. top cover of box
2. cleaning brush
3. longitudinal opening
4. protective screen
5. hook and loop fasteners
6. right end panel
7. front panel
8. top cover hinge
9. back panel
10. spring actuated roll.
11. right support pin
12. right support bracket
13. non-abrasive material
14. magnetic strip
15. shock absorbing material
16. attachment loop
17. attachment loop
18. area for signage
19. screen housing
20. left end panel
21. left support pin
22. left support bracket
23. locking hasp

DESCRIPTION—FIGS. 1A TO 4B

Figure 1B:
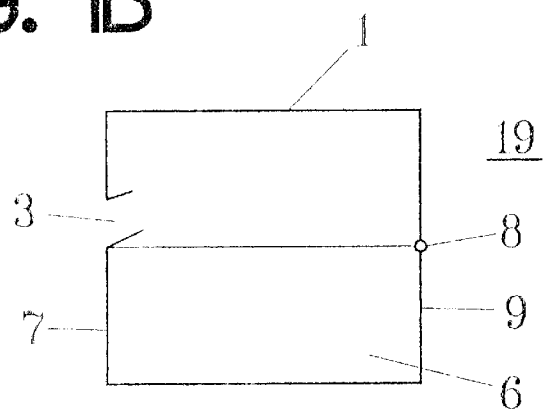
Figure 2:
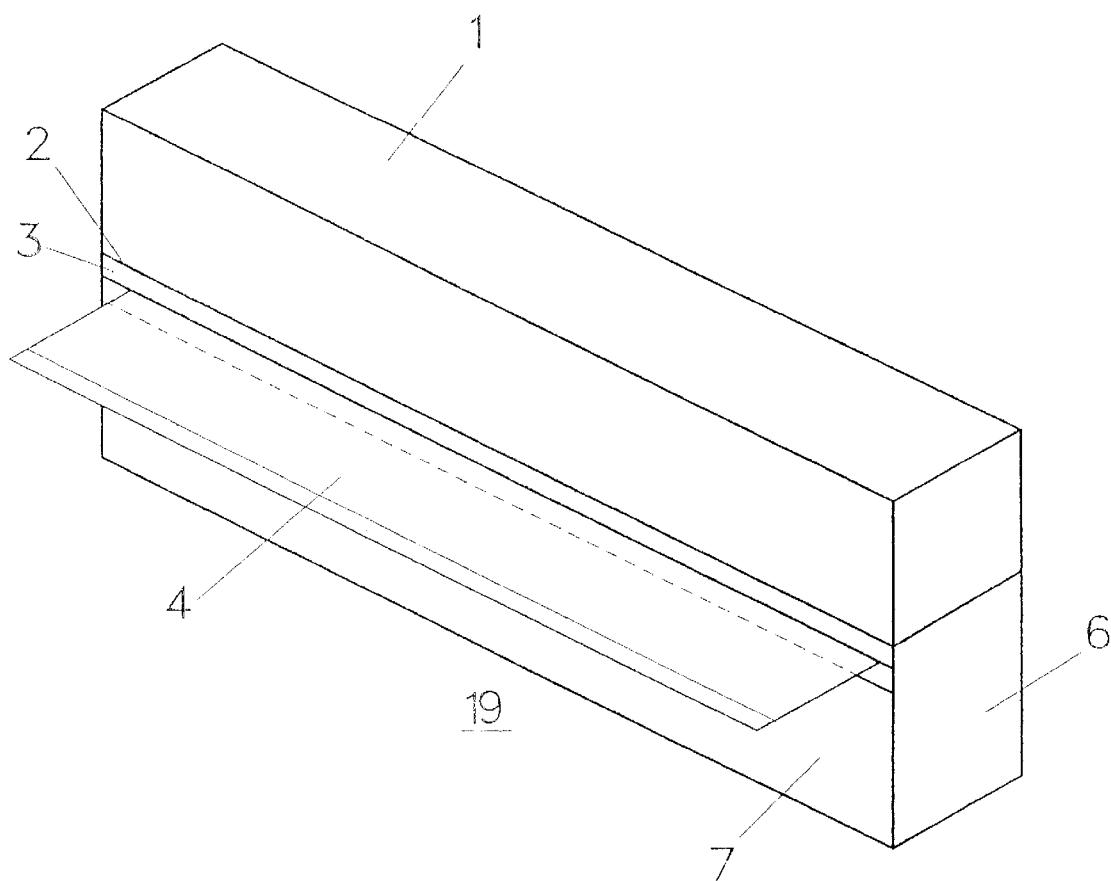

A typical embodiment of Protective Cover for the Sides of a Vehicle of the present invention is illustrated in FIGS. 1A to 2 (isometric views). Screen housing 19 has a front panel 7 that is equal in size to back panel 9 having a top cover 1 containing a hinge 8 that transcends entire length of screen housing 19 back panel 9 allowing top cover 1 to be easily opened. Housing 19 has a right end panel 6 that is equal in size to left end panel 20.

Figure 3A:
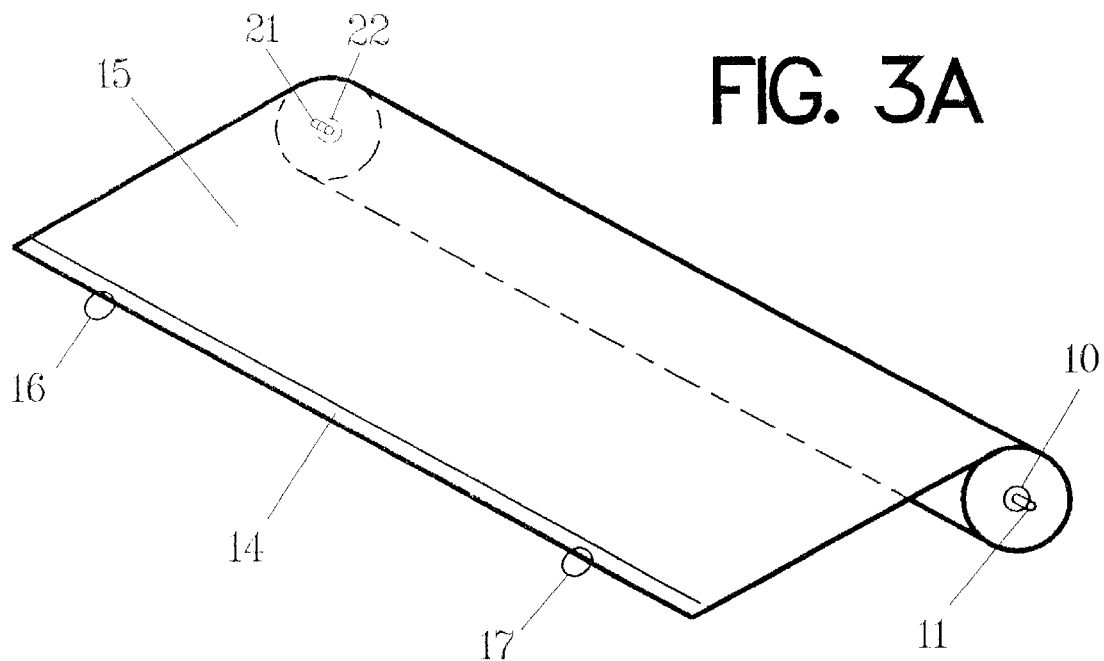
FIGS. 3A to 3B show roller assembly and screen.

Front panel 7 has a longitudinal opening 3 which houses a cleaning brush 2 that transcends length of front panel 7. This brush 2 cleans any debris that may collect on protective screen 4. Protective screen 4 has a hook and loop fasteners strip 5 that runs entire length of protective screen. This hook and loop fasteners strip 5 provides the attachment to spring actuated roller 10 in FIGS. 3A (isometric) and 3B (sectional). Attachment loops 16 and 17 provide a grip to pull screen out and also provides a stopping point when being retracted. Protective screen 4 is attached and wrapped around spring actuated roller 10 having one right support pin 11 on one end and a left support pin 21 on other end.

Figure 4A:
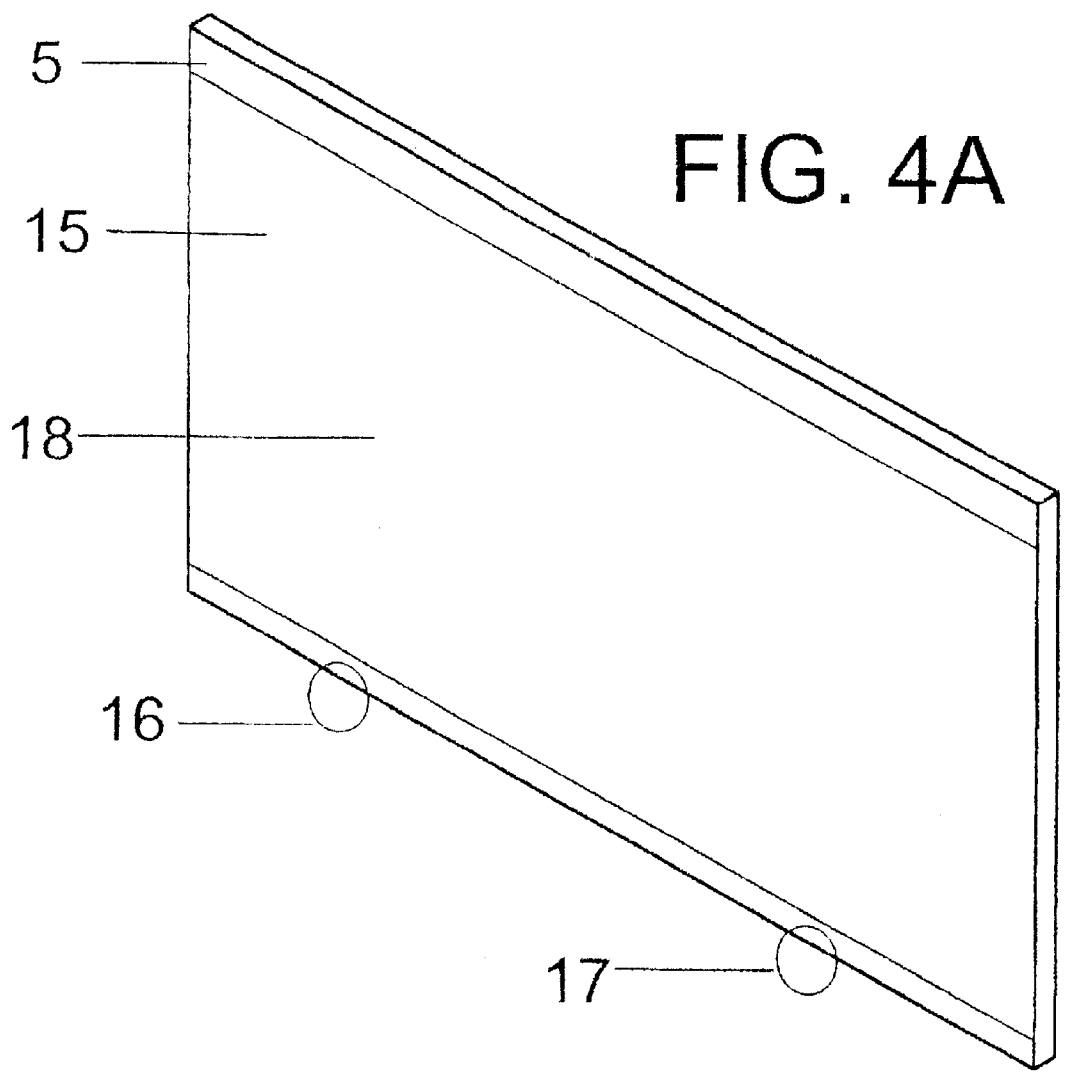
FIGS. 4A to 4B show various aspects of protective screen
Figure 4B:
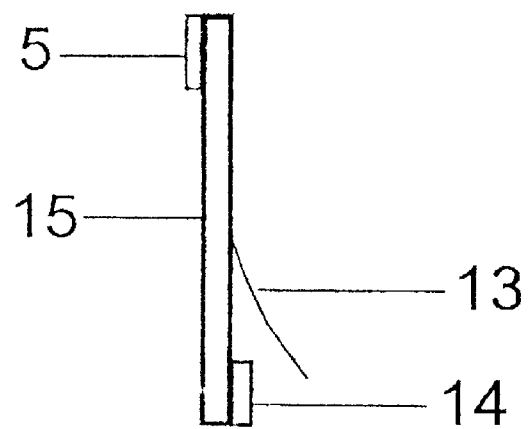

In FIGS. 4A (isometric) to 4B (sectional) Protective screen 4 consists of a top layer of shock absorbing material 15 and a bottom layer of non abrasive material 13. A magnetic strip 14 is inserted in the bottom section between top layer of shock absorbing material 15 and bottom layer of non abrasive material 13. This magnetic strip 14 along with attachment loops 16 and 17 attach Protective Cover for the Sides of a Vehicle to vehicle. A logo or any message 18 can be applied to protective screen 4.

OPERATIONAL DESCRIPTION OF THE INVENTION—FIG. 5

Figure 3B:
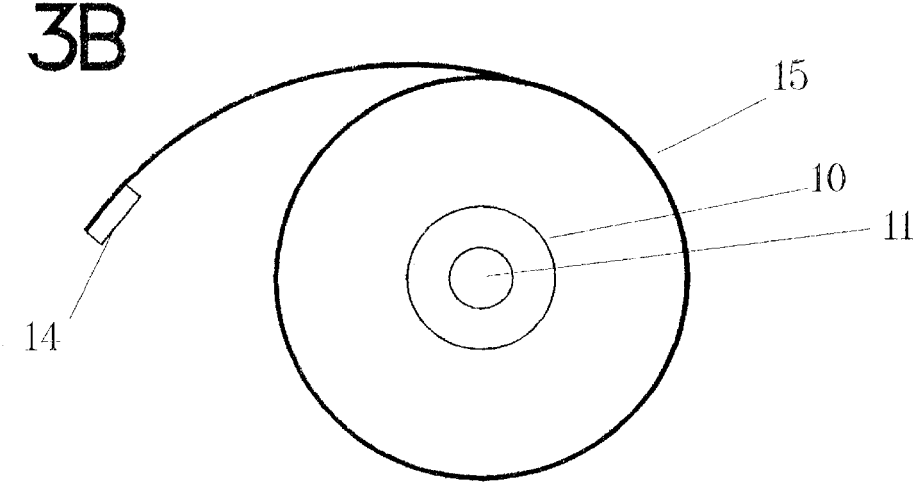
Figure 5:
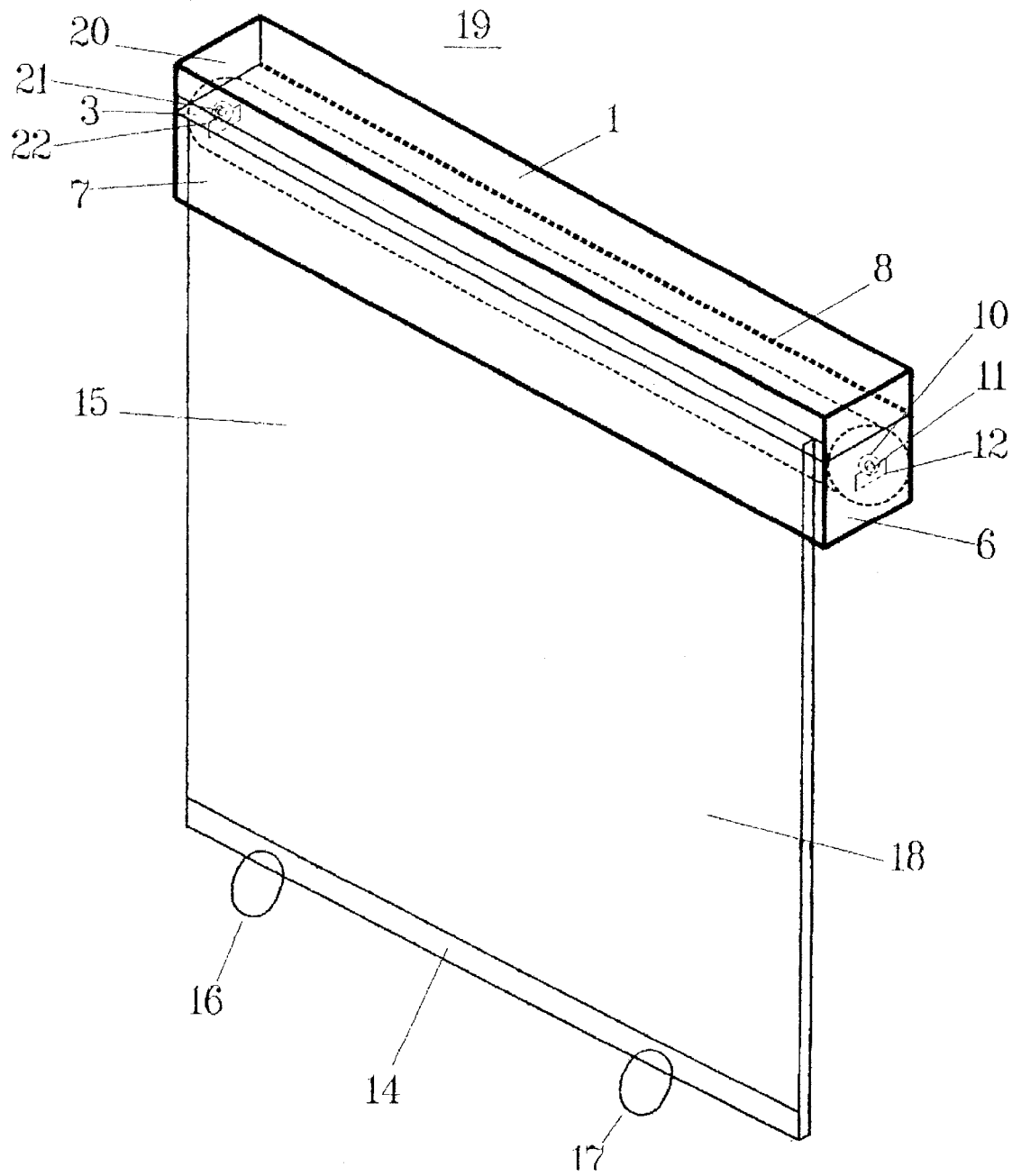
FIG. 5 shows a composite view of all components of Protective Cover for the Sides of a Vehicle.

The manner of using Protective Cover for the Sides of a Vehicle for the protection of the outer side bed wall of a pick up truck is described herein. One first installs Protective Cover housing 19 (FIG. 1A) with front panel 7 facing out towards the finish side of bed wall by bolting it to the top of side bed wall. With Protective Cover housing 19 in place one would open top cover 1 and place spring actuated roller 10 having protective screen 4 (FIGS. 3A and 3B) already attached into right support bracket 12 (FIG. 5) with right support pin 11 and lower protective screen 4 into left support bracket 22 with left support pin 21.

One then places protective screen 4 leading edge through longitudinal opening 3 and closes top cover 1. With both hands protective screen 4 is placed out to desired length for protection of side wall of vehicle and place protective screen 4 against vehicle using magnetic strip 14 and attachment loops 16 and 17 to secure it to vehicle. With protective screen 4 in place any material that would have damaged the finish of vehicle would now deflect off of protective screen 4.

When protective screen 4 is no longer required disengage attachments loops 16 and 17 and with both hands on protective screen 4 pull out towards yourself releasing magnetic strip 14 and allowing protective screen 4 to retract into screen housing 1. As it retracts cleaning brush 2 removes any loose material from Protective cover for the Sides of a Vehicle 4. With protective screen 4 back in the screen housing 19 locking hasp 23 can be used to keep screen housing 19 from opening accidentally.

What is claimed is:

1. A truck side wall protector comprising a storage compartment having a bottom panel, two opposing side walls and a pair of end walls to form an open front storage compartment said front wall having an elongated hinge cover therein extending horizontally substantially across said compartment, an elongated roller assembly rotatably mounted within said compartment on the end walls thereof, said roller assembly adapted to provide a biasing action when rotated in one direction, a protective cover of flexible shock absorbing material with a top surface suitable to receive printing for logo or sign with a bottom surface of non abrasive material having front, rear and side edges, said protective cover being attached at the front edge thereof on said roller assembly, is rotated in said direction when said protective cover is unrolled through front opening to a covering position, when said protective cover is retracted through front opening a brush assembly deflects attached debris protecting said assembly from damage and unnecessary maintenance.

* * * * *